Oct. 3, 1961    J. P. WALTERS    3,003,093
STEPPER MOTOR WITH HOMING DEVICE
Filed May 19, 1958    3 Sheets-Sheet 1

Oct. 3, 1961  J. P. WALTERS  3,003,093
STEPPER MOTOR WITH HOMING DEVICE
Filed May 19, 1958  3 Sheets-Sheet 2

United States Patent Office

3,003,093
Patented Oct. 3, 1961

3,003,093
STEPPER MOTOR WITH HOMING DEVICE
Joseph P. Walters, San Gabriel, Calif., assignor to Clary Corporation, San Gabriel, Calif., a corporation of California
Filed May 19, 1958, Ser. No. 736,252
14 Claims. (Cl. 318—134)

This invention relates to incremental or stepper motors and has particular reference to duo-directional motors of this type which are controlled by electrical impulses.

Stepper motors are used in a variety of different applications to effect remote control of instruments, mechanisms, or the like incorporated, for example, in computing systems, vehicle guidance systems, and navigational systems. In such applications, an output shaft is rotated in either direction to different angular positions or through different revolutions under control of electrical impulses generally derived from a remote control station.

A principal object of the present invention is to provide a stepper motor capable of relatively high speeds in either direction.

Another object is to provide a stepper motor which requires a minimum amount of power to operate the same.

Another object is to provide a stepper motor in which any tendency of the output shaft to overthrow is prevented.

Another object is to provide a homing device for a stepper motor, which device utilizes the incremental drive instrumentalities of the motor to return the same to home position.

Another object is to provide a homing device for a stepper motor effective to home the same in the direction of shortest return.

Another object is to provide a stepper motor which is relatively simple and compact in construction.

The manner in which the above and other objects of the invention are accomplished will be readily understood on reference to the following specification when read in conjunction with the accompanying drawings, wherein.

Figures 1, 2, 3:
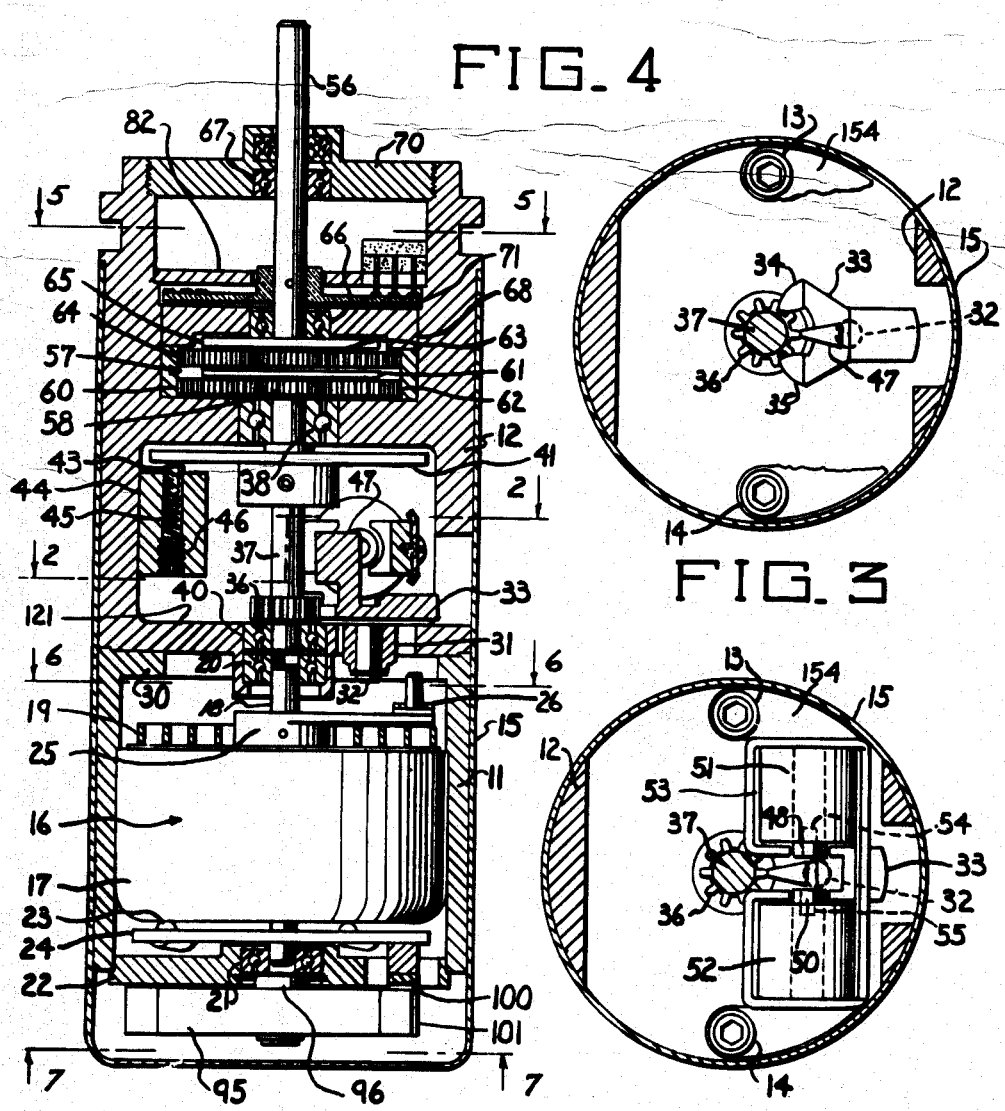
FIG. 1 is a longitudinal sectional view through a stepper motor embodying a preferred form of the present invention.
FIG. 2 is a transverse sectional view taken substantially along the line 2—2 of FIG. 1.
FIG. 3 is a transverse sectional view similar to FIG. 2, but with the direction control magnets broken away.

Referring in particular to FIG. 1, the motor comprises a two-part cylindrical housing, including a lower part 11 and an upper part 12 integrally attached together by screws 13 and 14, FIGS. 2 and 3. A thin protective shell 15 surrounds both housing parts.

A rotary solenoid, generally indicated at 16, is fitted in the housing part 11 and is suitably secured therein. The solenoid 16 is a commercially available unit of a type similar to that disclosed in the George H. Leland Patent No. 2,473,598, issued on June 21, 1949, and comprises a housing 17 which encloses a solenoid coil (not shown) cooperating with an armature mounted on a shaft 18. The shaft 18 is rotatably and slideably mounted at opposite ends thereof in ball bearings 20 and 21. The bearing 20 is carried by the lower end wall 121 of the housing part 12 and the bearing 21 is carried by an end plate 22 attached to the lower end of the housing part 11.

Figure 6:
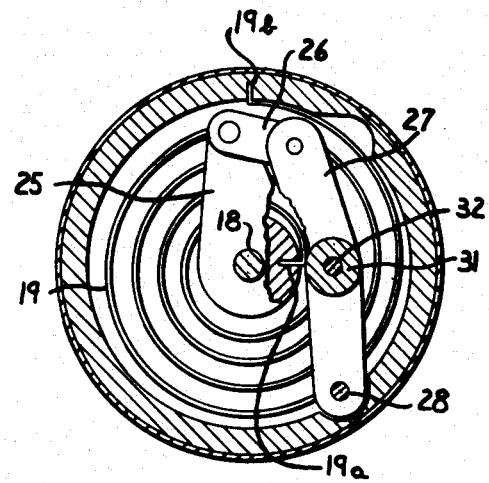
FIG. 6 is a transverse sectional view taken substantially along the line 6—6 of FIG. 1.
Figure 8:
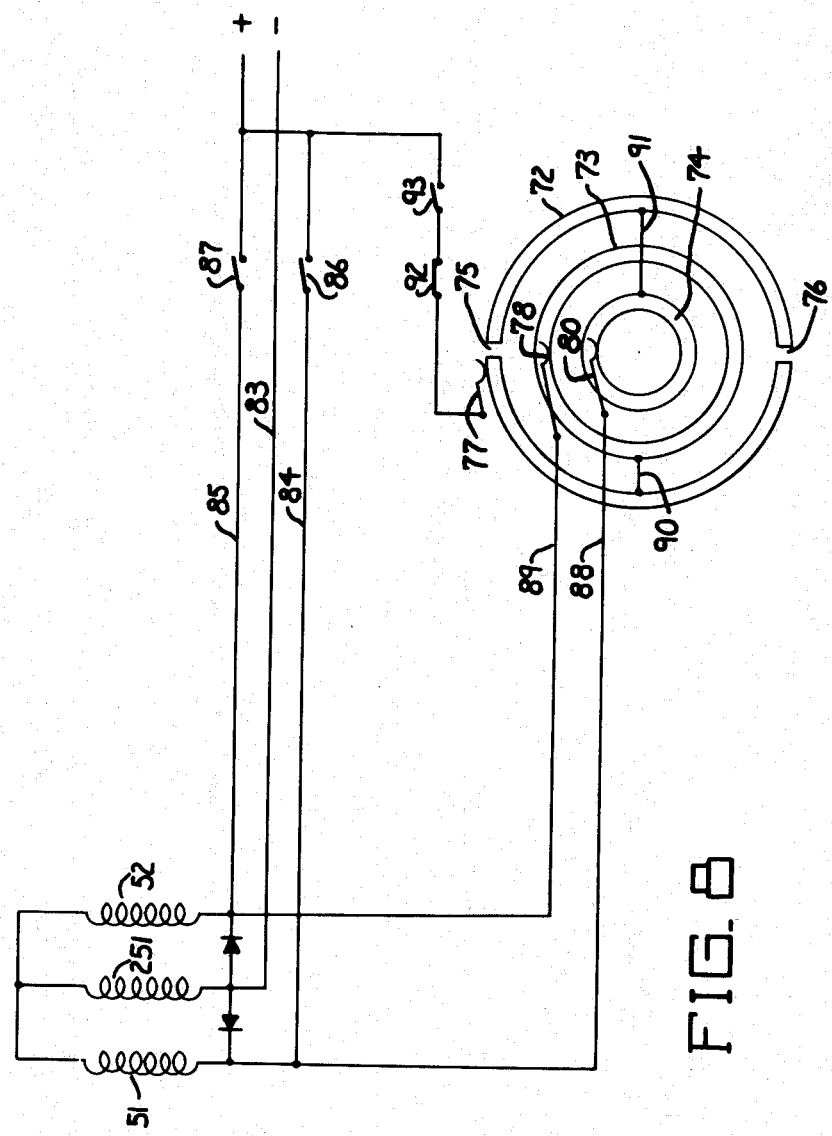
FIG. 8 is a schematic diagram of the electrical control circuit for the motor.

The solenoid 16 includes a series of balls 23 which are located intermediate the bottom portion of the solenoid housing 17 and inclined grooves formed in a disc 24 attached to the solenoid shaft 18. When the solenoid coil, indicated at 251 in the circuit of FIG. 8 is energized, the solenoid armature (not shown) and shaft 18 is pulled upwardly. The balls 23, acting against the cooperating inclined grooves, thus force the disc 24 and shaft 18 to rotate through an appreciable angle in a clockwise direction (as viewed in FIG. 6) against the force exerted by a torsion spring 19 anchored at 19a on the hub of an arm 25 attached to the shaft 18 and anchored at 19b to the housing part 11.

The arm 25 is connected through a link 26 (see also FIG. 6) to the outer end of an arm 27 which is fulcrummed at 28 in the upper wall 30 of the lower housing part 11. Intermediate its ends, the arm 27 is provided with a bushing 31 which pivotally supports a pin 32 integral with an actuating pawl 33.

Figure 4:
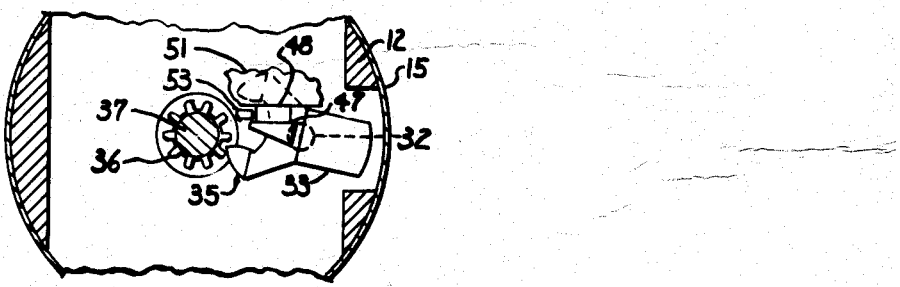
FIG. 4 is a transverse sectional view similar to FIG. 3, but with parts broken away and illustrating the actuator pawl in a position assumed at the start of a drive stroke in one direction.

Referring to FIGS. 1, 3 and 4 in particular, the actuating pawl 33 is provided with two opposed pawl teeth 34 and 35 which normally engage the teeth of an output gear 36 formed integral with a drive shaft 37. The latter is rotatably mounted at its opposite ends in ball bearings 38 and 40 and carries a detent disc 41 which may be engaged by a felt friction pad 43. The latter is slideable in a bearing opening formed in a block 44 suitably attached to the interior of the housing part 12. A compression spring 45 is interposed between the pad 43 and a set screw 46 to normally hold the pad 43 in frictional engagement with the disc 41 to thereby yieldably detent the shaft whenever the actuator pawl 33 is out of detenting engagement with the gear 36.

The pawl 33 is provided with a pole piece 47 of magnetically permeable material having low magnetic retentivity. The pole piece 47 extends between the pole pieces 48 and 50 of two opposed direction control electromagnets 51 and 52, respectively. The actuator pawl pole piece 47 is wedge-shaped when viewed from the top so that when the pawl is moved to its clockwise rocked position shown in FIG. 4 from its neutral position shown in FIG. 3, the pole piece will slideably engage the magnet pole piece 48. Also, when the pawl is moved to its counterclockwise rocked position, the pole piece 47 will slideably engage the magnet pole piece 50.

The teeth 34 and 35 of the actuator pawl 33 are so formed that when the actuator pawl is retracted from the gear 36 and rocked into its position shown in FIG. 4, the tooth 35 will engage between two of the teeth of the gear 36 and the other tooth 34 will be located out of engagement therewith. When the pawl is thereafter moved inward toward the gear 36, the tooth 35 will advance the gear one increment or tooth space in a clockwise direction. In doing so, the gear will force the pawl toward its neutral position of FIG. 3, and as the parts approach this position, the opposite tooth 34 will engage the gear teeth on the opposite side of gear 36, thereby preventing any overthrow or rebound of the gear and its shaft.

A similar action will occur when the pawl 33 is initially rocked counterclockwise from its neutral position except that the gear will be advanced one increment in a counterclockwise direction.

In view of the detenting action of the pawl 33, the friction pad 43 may in most cases be removed.

The electromagnets 51 and 52 are supported by a magnetic flux conducting frame 53 of magnetically permeable material which is provided with tabs 154 supported on the lower wall 121 of the housing part 12 by the screws 13 and 14.

Permanent magnet slugs 54 and 55 are pressed into openings formed in the opposing ends of the pole pieces 48 and 50, respectively, and terminate flush with the ends of such pole pieces. Upon rocking the pawl 33 into either of its two alternate positions by the magnet 51 or 52, the permanent magnet attached to such pole piece cooperates with the pole piece 47 to thereafter tend to yieldably hold the pawl in such rocked position until the gear 36 returns the same to neutral as described above.

The shaft 37 is connected to an output shaft 56 through a gear reduction unit, generally indicated at 57. The gear reduction unit comprises a sun gear 58 suitably attached to the upper end of the shaft 37 and meshing with a series of planetary gears 60 rotatably mounted on a carrier 61 and in turn meshing with an internal ring gear 62 suitably attached to the upper housing part 12. The carrier 61 has attached thereto a second sun gear 63 which meshes with a second series of planetary gears 64, the latter also meshing with the internal gear 62. The planetary gears 64 are rotatably carried by a second carrier 65 fastened to the lower end of the shaft 56. The latter shaft is rotatably mounted in bearings 66 and 67 mounted in plates 68 and 70 secured in the housing part 12.

In the embodiment herein disclosed, the gear train 57 effects a reduction in speed from shaft 37 to shaft 56 at a ratio of 18 to 1. It will be noted that the gear 36 comprises ten teeth. Accordingly, since the gear 36 will move through 36° during each increment of advance thereof, the output shaft will advance 2° during such advancement. Obviously, gear reduction units having different ratios may be substituted if desired.

Figure 5:
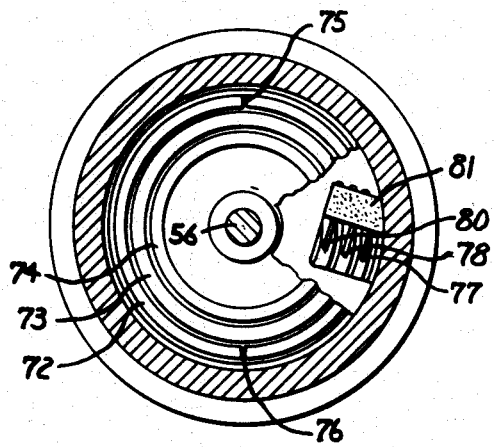
FIG. 5 is a transverse sectional view taken substantially along the 5—5 line of FIG. 1 with parts broken away.

Describing now the homing device and referring in particular to FIGS. 1 and 5, a disc 71 of insulating material, such as plastic, is attached to the output shaft 56 and has bonded or otherwise secured to the surface thereof, three concentric slip rings 72, 73 and 74 (see also FIG. 8). The outer ring 72 is split into two parts, the breaks, i.e. 75 and 76 being located 179° apart on one side and 181° on the other side, the purpose of which will be described hereinafter.

Wiping brushes 77, 78 and 80 are maintained in continual wiping contact with respective ones of the rings. These brushes are held by a block 81 of insulating material mounted on a plate 82 suitably secured to the housing part 12.

Referring to FIG. 8, it will be noted that the upper end of the rotary solenoid coil 251 is directly connected to the upper ends of the coils of the direction control magnets 51 and 52. The lower end of the coil 251 is connected through a line 83 to a source of negative potential, while the lower ends of the magnet coils 51 and 52 are connected through lines 84 and 85 and normally open pulsing switches 86 and 87, respectively, to a source of positive potential. The lower ends of coils 51 and 52 are also connected through lines 88 and 89 to the wiping brushes 80 and 78, respectively, associated with the inner and center slip rings.

It will be noted that the left hand outer slip ring section is connected through a line 90 to the center slip ring 73 and the right hand outer slip ring section is connected by line 91 to the inner slip ring 74. Also, the outer slip ring brush 77 is connected through a self-interrupting switch 92 and normally open contacts 93 to the source of positive potential.

Figure 7:
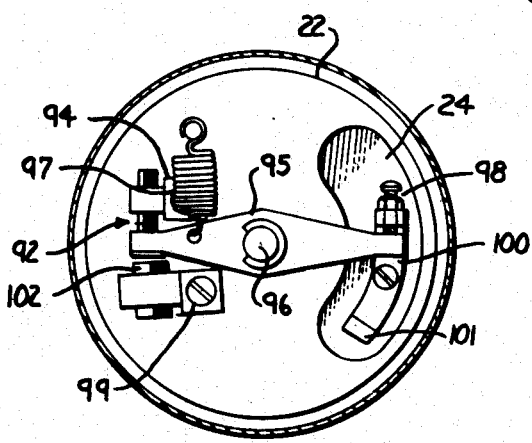
FIG. 7 is a transverse sectional view illustrating the self-interrupting contacts associated with the homing device and is taken along the line 7—7 of FIG. 1.

Describing now the self-interrupting switch 92 (see also FIG. 7), the stationary contact thereof is suitably supported by a block 94 of insulating material attached to the bottom plate 22 of the lower housing part 11. The movable contact of switch 92 is mounted on an arm 95 which is pivotally supported on a stud 96 attached to the plate 22. A tension spring 97 normally holds the arm in a position to close the switch 92. When the solenoid 16 is deenergized, an adjustable actuator screw 98, mounted on a block 100 suitably attached to the disc 24, engages the opposite end of the arm 95. However, upon energization of the solenoid 16, a shoulder 101 on the block 100 engages the arm 95 toward the end of the rotary movement of the disc 24, swinging the arm 95 counterclockwise to open the switch 92 and to bring the arm into contact with a permanent magnet 102. The latter is mounted on a support 99 attached to the bottom wall 22 and when engaged by the arm 95, is effective to hold the arm against the action of the spring 97 whereby to maintain the switch open until the solenoid 16 is returned to its normal position by the spring 19 at which time the screw 98 will abut the arm 95 to return it to its normal position, closing the switch 92.

Describing now the operation of the motor, closure of one or the other of the pulsing switches 86 and 87 will simultaneously energize the solenoid coil 25 and the respective one of electromagnets 51 and 52. Assuming the switch 86 to be momentarily closed, the solenoid 16 will actuate arm 25 to cause lever 27 to retract the actuator pawl 33 away from the gear 36. Simultaneously, the magnet 51 which is also energized at this time, will attract the pawl 33 into its clockwise rocked position shown in FIG. 4. Upon opening the switch 86, the spring 19 will return the arm 25, causing the pawl 33 to advance inwardly toward the gear 36 whereupon the tooth 35 will incrementally advance the gear one tooth space in a clockwise direction. As the pawl reaches its inward neutral position shown in FIG. 3, it is in a position to again be actuated to advance the gear an additional increment in one direction or the other depending on which of the pulsing switches 86 and 87 is then closed. It will be appreciated that the switches 86 and 87 may be closed either manually or by any suitable control means.

In the event it is desired to return the output shaft to its normal home position wherein the brush 77 rests directly on the break 75, the switch 93 is closed and held closed. If during such closure the brush 77 engages the left hand section (FIG. 8) of the outer slip ring 72, a circuit will be completed from the source of positive potential through the self-interrupting switch 92, left-hand section of the slip ring 72, slip ring 73, line 89, magnet 52 and coil 251 to the source of negative potential. As the solenoid 16 is actuated, the shoulder 101 (FIG. 7) will engage arm 95 to open the switch 92 permitting the spring 19 to advance the pawl 33 and thus incrementally advance the output shaft counterclockwise, as viewed in FIGS. 5 and 8, toward the upper break 75. The break 75 is so angularly spaced relative to the teeth of the gear 36 that during the last step toward the home position, the break 75 will be centered directly below the brush 77 thereby arresting the motor in its home position even though the switch 93 is thereafter held closed.

In the event that the right hand section of the ring 72 is located under the brush 77 when the homing switch 93 is closed, the homing circuit will be completed through the electromagnet 51 thereby causing the shaft to be driven clockwise toward its home position until the break 75 reaches the brush 77.

From the above, it will be seen that the motor will return to its home position in the shortest direction regardless of where it is initially located.

As noted heretofore, the break 76 is located 179° (on one side) from the break 75. Thus, since the output shaft advances 2° per step, the brush 77 will never stop directly on the break 76, but will contact a slip ring section on either side thereof.

Although I have described my invention in detail and have therefore used certain specific terms and language herein, it is to be understood that the present disclosure is illustrative rather than restrictive and that changes and modifications can be made without departing from the spirit or scope of the invention as set forth in the claims appended hereto.

Having thus described the invention, what I desire to secure by United States Letters Patent is:

1. A stepping motor comprising a rotatable driven element, an actuator therefor having a pair of driving teeth, means for moving said actuator through a driving stroke, said actuator being locatable selectively in a first position wherein one of said teeth thereof incrementally drives said driven element in one direction or in a second position wherein the other of said teeth thereof incrementally drives said driven element in the opposite direction during said stroke, means on said actuator forming an armature, a first electromagnetic means other than said moving means and cooperable with said armature to locate said actuator in said first position, and a second electromagnetic means other than said moving means and cooperable with said armature to locate said actuator in said second position.

2. A stepping motor comprising a rotatable driven element, an actuator therefor having a pair of driving teeth thereon, means for moving said actuator through a driving stroke, said actuator being arranged to move selectively in a first path wherein one of said teeth thereof incrementally drives said driven element in one direction during said stroke or in a second path wherein the other of said teeth thereof incrementally drives said driven element in the opposite direction during said stroke, means on said actuator forming an armature, a first electromagnetic means cooperable with said armature to position said actuator in said first path, a second electromagnetic means cooperable with said armature to position said actuator in said second path, and magnet means cooperable with said armature for retaining said actuator in either of said paths in which it is positioned during movement of said actuator through said stroke.

3. A stepping motor comprising a rotatable driven element, an actuator therefor having a pair of driving teeth, means for moving said actuator through a driving stroke, said actuator being arranged to move selectively in a first path wherein one of said teeth thereof incrementally drives said driven element in one direction during said stroke or in the second path wherein the other of said teeth thereof incrementally drives said element in the opposite direction during said stroke, means on said actuator forming an armature, means for selectively positioning said actuator in said first or second path, and permanent magnet means cooperable with said armature for retaining said actuator in either of said paths in which it is positioned during movement of said actuator through said stroke.

4. A stepping motor comprising a rotatable driven element, an actuator therefor having a pair of driving teeth, means for moving said actuator through a driving stroke, said actuator being arranged to move selectively in a first path wherein one of said teeth thereof drives said driven element one increment in one direction during said stroke or in a second path wherein the other of said teeth thereof drives said driven element one increment in the opposite direction during said stroke, means on said actuator forming an armature, means for selectively positioning said actuator in one or the other of said paths, and magnet means cooperable with said armature for yieldably maintaining said actuator in either of said paths in which it is positioned during movement of said actuator through said stroke, said driven element being effective during driving movement of said actuator to cause said actuator to engage both of said teeth with said element whereby to prevent overthrow of said element beyond said increment.

5. A stepping motor comprising a rotatable driven element, an actuator therefor having a pair of driving teeth, spring means normally maintaining said actuator in a position to engage said teeth with said element whereby to restrain said element from rotation, means for withdrawing said actuator from said element and for thereafter allowing said spring means to move said actuator through a driving stroke, means for selectively positioning said actuator in either a first path wherein one of said teeth is effective to drive said element one increment in one direction upon movement of said actuator by said spring or in a second path wherein the other of said teeth is effective to drive said element one increment in the opposite direction upon movement of said actuator by said spring, and means for yieldably maintaining said actuator in either of said paths in which it is positioned during movement of said actuator by said spring.

6. A stepping motor comprising a rotatable driven element, an actuator therefor having a pair of driving teeth, spring means normally maintaining said actuator in a position to engage said teeth with said element whereby to restrain said element from rotation, electromagnetic means for withdrawing said actuator and for thereafter permitting said spring to move said actuator in a driving stroke toward said element, means for selectively positioning said actuator in either a first path wherein one of said teeth is effective to drive said element one increment in one direction during said driving stroke or in a second path wherein the other of said teeth is effective to drive said element one increment in the opposite direction during said driving stroke, and permanent magnet means cooperable with said actuator for yieldably maintaining said actuator in either of said paths in which it is positioned during said driving stroke.

7. A stepping motor comprising a rotatable driven element, an actuator therefor having a pair of driving teeth, means pivotally supporting said actuator, spring means normally maintaining said actuator in a position to engage both of said teeth with said element whereby to restrain said element from rotation, means for withdrawing said actuator and for thereafter permitting said spring to advance said actuator through an element driving stroke, means for selectively positioning said actuator about said pivotal supporting means into a first path wherein one of said teeth is effective to drive said element one increment in one direction during movement of said actuator through said driving stroke or into a second path wherein the other of said teeth is effective to drive said element one increment in the opposite direction upon movement of said actuator through said driving stroke, and magnetic means cooperable with said actuator for yieldably maintaining said actuator in either of said paths in which it is positioned during movement of said actuator through said driving stroke.

8. A stepping motor comprising a rotatable driven element, an actuator therefor having a pair of driving teeth, means for moving said actuator through a driving stroke, said actuator being arranged to move selectively in a first path wherein one of said teeth thereof incrementally drives said driven element in one direction during said stroke or in a second path wherein the other of said teeth thereof incrementally drives said driven element in the opposite direction during said stroke, means on said actuator forming an armature, a first electromagnet including a pole piece cooperable with said armature to position said actuator in said first path; said pole piece including a permanent magnet; and a second electromagnet including a pole piece cooperable with said armature to position said actuator in said second path; said last mentioned pole piece including a second permanent magnet; said permanent magnets cooperating with said armature to retain said actuator in either of said paths in which it is positioned during movement of said actuator through said stroke.

9. A stepping motor comprising a rotatable driven element, an actuator therefor having a pair of driving teeth, spring means normally maintaining said actuator in a position to engage said teeth with said element whereby to restrain said element from rotation, electromagnetic means for withdrawing said actuator from said element and for thereafter allowing said spring means to move said actuator through a driving stroke, said actuator being arranged to move selectively in a first path wherein one of said teeth thereof incrementally drives said driven element in one direction during said stroke or in a second path wherein the other of said teeth thereof incrementally drives said driven element in the opposite direction during said stroke, a first electromagnet cooperable with said actuator to position said actuator in said first path, a second electromagnet cooperable with said actuator to position said actuator in said second path, and means for selectively energizing and thereafter deenergizing either said electromagnetic means and said first electromagnet or said electromagnetic means and said second electromagnet.

10. A stepping motor comprising a rotatable driven element, an actuator therefor having a pair of driving teeth, spring means normally maintaining said actuator in a position to engage said teeth with said element whereby to restrain said element from rotation, electromagnetic means for withdrawing said actuator from said element and for thereafter allowing said spring means to move said actuator through a driving stroke, said actuator being arranged to move selectively in a first path wherein one of said teeth thereof incrementally drives said driven element in one direction during said stroke or in a second path wherein the other of said teeth thereof incrementally drives said driven element in the opposite direction during said stroke, means on said actuator forming an armature, a first electromagnet cooperable with said armature to position said actuator in said first path, a second electromagnet cooperable with said armature to position said actuator in said second path, magnet means cooperable with said armature for retaining said actuator in either of said paths in which it is positioned during movement of said actuator through said stroke, and means for selectively momentarily energizing either said electromagnetic means and said first electromagnet or said electromagnetic means and said second electromagnet.

11. A stepping motor comprising a rotatable driven element, an actuator therefor having a pair of driving teeth, spring means normally maintaining said actuator in a position to engage said teeth with said element whereby to restrain said element from rotation, electromagnetic means for withdrawing said actuator from said element and for thereafter allowing said spring means to move said actuator through a driving stroke, said actuator being arranged to move selectively in a first path wherein one of said teeth thereof incrementally drives said driven element in one direction during said stroke or in a second path wherein the other of said teeth thereof incrementally drives said driven element in the opposite direction during said stroke, means on said actuator forming an armature, a first electromagnet including a pole piece cooperable with said armature to position said actuator in said first path; said pole piece including a permanent magnet; a second electromagnet including a pole piece cooperable with said armature to position said actuator in said second path; said last mentioned pole piece including a second permanent magnet; said permanent magnets cooperating with said armature to retain said actuator in either of said paths in which it is positioned during movement of said actuator through said stroke, and means for selectively momentarily energizing either said electromagnetic means and said first electromagnet or said electromagnetic means and said second electromagnet.

12. In a stepping motor having a rotatable driven element and an electrically controlled oscillatable drive unit for incrementally advancing said driven element, said drive unit being movable through one oscillation upon application of an electrical impulse thereto whereby to advance said driven element one increment; a homing device for returning said motor to a home position comprising a direct current circuit including interrupting contacts; means for holding said contacts closed, means for holding said contacts open, means operable by said drive unit adjacent one extreme of its oscillation for opening said contacts, means operable by said drive unit adjacent the opposite extreme of its oscillation for closing said contacts, and means other than said contacts and responsive to said driven element upon reaching said home position for breaking said circuit and for preventing making of said circuit by said contacts.

13. In a stepping motor having a rotatable driven element and an electrically controlled oscillatable drive unit for incrementally advancing said driven element, said drive unit being movable through one oscillation upon application of an electrical impulse thereto whereby to advance said driven element one increment; an electric homing circuit for said motor including interrupting contacts and a source of direct current; means for holding said contacts closed, means for holding said contacts open, means including a lost motion connection between said drive unit and said contacts; said last mentioned means being effective adjacent one extreme of a said oscillation of said drive unit to open said contacts and effective at the opposite extreme of a said oscillation of said drive unit to close said contacts, and means other than said contacts and responsive to said driven element upon reaching said home position for breaking said circuit and for preventing making of said circuit by said contacts.

14. In a stepping motor comprising a rotatable driven element and an electrically controlled oscillatable drive unit for incrementally advancing said driven element to and from a home position, said drive unit being movable through one oscillation upon application of an electrical impulse thereto whereby to advance said driven element one increment; an electric homing circuit for said motor including interrupting contacts, a source of direct current, means controlled by said driven element for causing said drive unit to advance said driven element in the direction of shortest travel toward said home position, spring means for holding said contacts closed, detent means for holding said contacts open, and means including a lost motion connection between said drive unit and said contacts; said last mentioned means being effective adjacent one extreme of said oscillation of said drive unit to open said contacts and effective adjacent the opposite extreme of the said oscillation of said drive unit to close said contacts.

References Cited in the file of this patent

UNITED STATES PATENTS

| | | |
|---|---|---|
| 1,832,474 | Bludworth et al. | Nov. 17, 1931 |
| 2,092,298 | Bauer | Sept. 7, 1937 |
| 2,851,619 | Jones | Sept. 9, 1958 |